H. J. VAN DER BIJL.
ALTERNATING CURRENT RESPONSIVE APPARATUS.
APPLICATION FILED JULY 6, 1914.
1,130,043.
Patented Mar. 2, 1915.
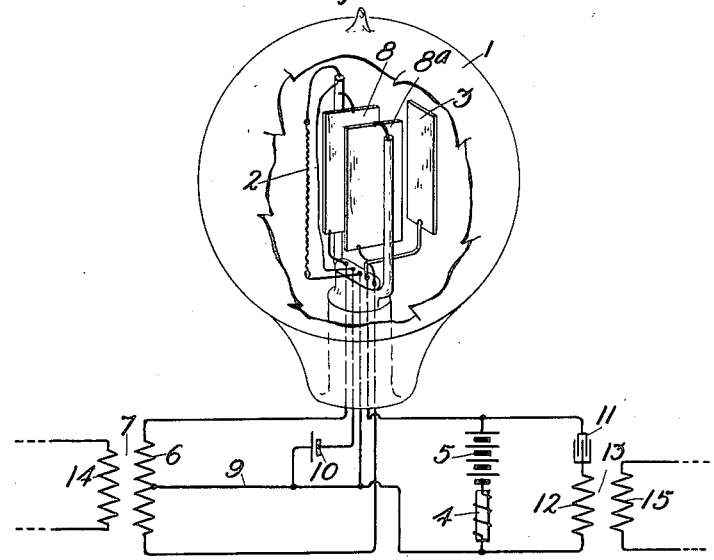
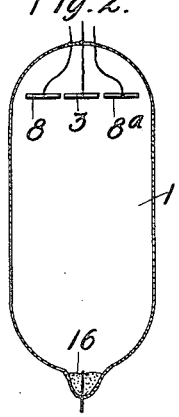
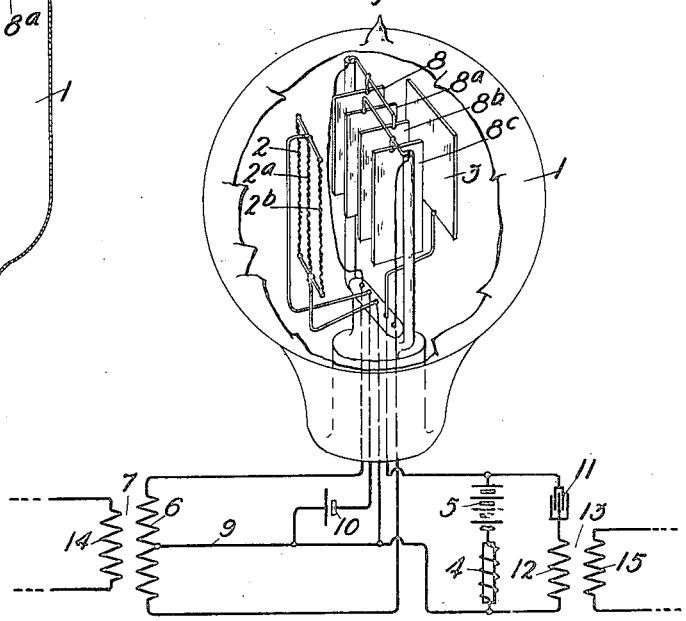
Witnesses:
O. M. Guthe
O. E. Rasmussen
Inventor:
Hendrik J. van der Bijl.
by A. C. Kenner, Att'y.

UNITED STATES PATENT OFFICE.

HENDRIK JOHANNES VAN DER BIJL, OF NEW YORK, N. Y., ASSIGNOR TO WESTERN ELECTRIC COMPANY, OF NEW YORK, N. Y., A CORPORATION OF ILLINOIS.

ALTERNATING-CURRENT-RESPONSIVE APPARATUS.

1,130,043.

Specification of Letters Patent.

Patented Mar. 2, 1915.

Application filed July 6, 1914. Serial No. 849,299.

*To all whom it may concern:*

Be it known that I, HENDRIK JOHANNES VAN DER BIJL, a subject of the King of Great Britain, residing at No. 54 Morningside Drive, New York, in the county of New York and State of New York, have invented a certain new and useful Improvement in Alternating-Current-Responsive Apparatus, of which the following is a full, clear, concise, and exact description.

This invention relates to apparatus and systems responsive to alternating currents.

One of its objects is the generation of alternating currents of a given frequency from a controlling source of alternating currents of a lesser frequency.

Another object is the detection of feeble electric oscillations.

In accordance with the invention, a stream of ions in a circuit to be controlled is influenced by a pair or a plurality of pairs of electrodes in such a manner that each half-wave of the alternating current impulses in a controlling circuit is effective in distorting or deflecting the stream of ions so as to change in the same direction the strength of the normal current in the controlled circuit. The two electrodes are located in the region of the stream of ions and are oppositely connected to the source of alternating current in the controlling circuit, a neutral connection being provided from said source to an electrode, preferably the ionizing cathode, in the controlled circuit. The stream of ions may be generated by a heated cathode, such as a metallic filament or Wehnelt cathode, or by a mercury cathode as in the mercury arc, or by any other suitable means. It is desirable, especially in the application of the invention to a thermionic device, to locate the two electrodes of the pair or of each pair in the controlling circuit on opposite sides of the stream, in which case they are preferably in the form of plates lying approximately parallel to the stream. The result of the combination stated is the generation of a fluctuating current in the controlled circuit having twice the frequency of the alternating current in the controlling circuit. By joining in a cascade formation a number of apparatus and circuits each adapted to generate a current having twice the frequency of the current impressed upon it, it is possible to attain any desired high frequency.

The invention will be more fully understood by reference to the accompanying drawings, wherein—

Figure 1 illustrates a thermionic device and system of circuits therefor embodying the invention; Fig. 2 illustrates a mercury arc apparatus suitable for use in the same circuit as that of Fig. 1, and Fig. 3 illustrates a modified thermionic device employing a plurality of electrodes for the controlling circuit, instead of a single pair as shown in Fig. 1.

Like reference characters are applied to parts having like functions in the several views.

Referring to the drawings generally, but more particularly to Fig. 1 thereof, a stream of ions is generated in the space inclosed by a vessel 1 between a heated filament or cathode 2, and an anode 3. The circuit to be controlled includes this stream of ions and may also include a reactance coil 4 and source of direct current 5. The controlling circuit includes the secondary winding 6 of a transformer 7 which is the immediate source of alternating current therein, and a pair of electrodes 8 and 8ª located in the region of the stream of ions, and preferably on either side thereof within the vessel 1. A neutral connection 9 from the middle point of the winding 6 leads to the cathode 2. A battery or other source of current 10 may be provided for heating the cathode. In shunt of the reactance coil 4 and source of current 5 is a branch including in series a condenser 11 and the primary winding 12 of a repeating coil 13. The repeating coil 7 has a primary winding 14 which receives alternating current from any desired source. The repeating coil 13 has a secondary winding 15, which may be connected to the incoming or primary winding 14 of another system of circuits like Fig. 1, or may be connected to any suitable receiving instrument, according to the use to which the apparatus is applied.

The circuit connections illustrated in Fig. 1 may be applied without modifications to the structure of Fig. 2, except that the battery 10 would not be used with the latter in which a mercury cathode 16 takes the place of the heated filament 2 of Fig. 1, and the stream of ions is that of a mercury arc instead of a thermionic current.

In Fig. 3 is shown an apparatus having three filaments, 2, $2^a$ and $2^b$, and four electrodes, 8, $8^a$, $8^b$ and $8^c$ in the form of plates. The filaments may be heated in any desired manner. As shown, they are connected in parallel to the battery 10. The electrodes 8 and $8^b$ are joined together and connected to one terminal of the winding 6, and the electrodes $8^a$ and $8^c$ are likewise joined together and connected to the other terminal of the winding 6. The three filaments lie parallel to the electrodes 8, $8^a$, $8^b$, $8^c$ and each at or adjacent the opening between and at one side of a pair of these electrodes. The anode, or plate 3, lies transversely to the planes of the electrodes 8, $8^a$, $8^b$, $8^c$ and at or adjacent the openings between and at the other side of said electrodes.

The operation is as follows, referring more particularly to Fig. 1: An alternate current received in the primary winding 14 of the repeating coil 7 is reproduced by the secondary winding 6 thereof in the controlling circuit and creates alternating and opposite potential changes on the electrodes 8 and $8^a$, 8 becoming positive while $8^a$ is negative, and conversely 8 becoming negative while $8^a$ is positive. A normal current flows from the source of direct current 5 in the controlled circuit, which includes in series the source 5, the reactance 4, the cathode 2, the anode 3 and the space between the cathode and anode. This space current is alternately distorted, or is deflected toward the electrode 8 and toward the electrode $8^a$ by each half-wave of the incoming current. Every distortion or deflection tends to reduce the current flow in the controlled circuit, that is to say, each of the two impulses of each complete cycle of the incoming current produces a like change, i. e., a like reduction in the strength of current flowing in the controlled circuit. The complete cycle of current in the latter circuit is thus just one-half the duration of the incoming current and therefore the frequency of variations of current in the controlled circuit is just twice the frequency of the incoming alternating current. These variations in the controlled circuit may be reproduced by the secondary winding 15 of the transformer 13 in any other circuit or apparatus that may be connected thereto. By connecting together in cascade arrangement a number of circuit systems like Fig. 1, the frequency of current delivered to the first in the series may be increased to any desired extent in the last of the series.

The operation with the structure shown in Fig. 2 is substantially the same as with that of Fig. 1. The normal arc stream in the controlled circuit of Fig. 2 between the cathode 16 and the anode 3 is deflected during one-half cycle of the incoming waves toward the electrode 8 and during the other half cycle thereof toward the electrode $8^a$, thus producing double the frequency of changes as in the case of the system of Fig. 1.

With the structure shown in Fig. 3, there are three parallel streams of ions from the filaments to the anode or plate 3, each influenced by a pair of electrodes. The stream from the filament 2 is influenced by the electrodes 8 and $8^a$; that from the filament $2^a$ by the electrodes $8^b$ and $8^a$, and that from the filament $2^b$ by the electrodes $8^b$ and $8^c$. The operation, however, is essentially the same as that described with reference to Fig. 1, the difference being merely that the multiplicity of filaments and electrodes tends to a greater capacity in output energy.

The apparatus herein described is useful not only as means for generating a very high frequency alternating current, with the cascade formation mentioned, but also as an oscillating wave detector, inasmuch as the alternate impulses of the incoming waves produce a net change of current in the same direction in the controlled circuit.

What is claimed is:

1. The combination of a circuit to be controlled including a pair of electrodes and a stream of ions therebetween, a controlling circuit including a source of alternating current, a neutral connection from said source of current to one of said electrodes, and a second pair of electrodes oppositely connected to said source and located in the region of said stream.

2. The combination of a circuit to be controlled including a pair of electrodes and a stream of ions therebetween, a controlling circuit including a source of alternating current, a neutral connection from said source of current to one of said electrodes, and a second pair of electrodes oppositely connected to said source, located in the region of said stream and adapted under the influence of said alternating current to deflect said stream.

3. The combination of a circuit to be controlled including a pair of electrodes and a stream of ions therebetween, a controlling circuit including a source of alternating current, a neutral connection from said source of current to one of said electrodes, and a second pair of electrodes oppositely connected to said source and located on opposite sides of said stream.

4. The combination of a circuit to be controlled including a cathode and a stream of ions moving therefrom in space, a controlling circuit including a source of alternating current, a neutral connection from said source of current to said cathode, and a second pair of electrodes oppositely connected to said source and located in the region of said stream.

5. In a thermionic device the combination of a circuit to be controlled including a heated cathode, an anode and a stream of ions moving therebetween, a controlling circuit including a source of alternating current, a neutral connection from said source of current to said heated cathode, and a pair of electrodes oppositely connected to said source and located in the region of said stream.

6. The combination of a circuit to be controlled, including a pair of electrodes and a stream of ions moving therebetween, a controlling circuit including a source of alternating current, a neutral connection from said source of current to one of said electrodes, and a second pair of electrodes in the form of plates oppositely connected to said source and located in the region of and parallel to said stream.

In witness whereof, I hereunto subscribe my name this 3rd day of July A. D., 1914.

HENDRIK JOHANNES VAN DER BIJL.

Witnesses:
K. L. STAHL,
NAROD E. TUTHILL.